United States Patent [19]

Broder

[11] 3,975,836

[45] Aug. 24, 1976

[54] LOGIC LEARNING APPARATUS

[76] Inventor: Leonard J. Broder, 3192 Darvany Drive, Dallas, Tex. 75220

[22] Filed: Mar. 31, 1975

[21] Appl. No.: 563,499

[52] U.S. Cl. .................................................. 35/30
[51] Int. Cl.² ........................................ G09B 23/02
[58] Field of Search ................ 35/30, 9 B, 9 C, 10

[56] References Cited
UNITED STATES PATENTS

| | | | |
|---|---|---|---|
| 2,564,089 | 8/1951 | Williams et al. | 35/9 B |
| 3,100,943 | 8/1963 | Preston | 35/30 |
| 3,309,793 | 3/1967 | Bartee | 35/10 |
| 3,327,405 | 6/1967 | Ingeneri | 35/9 C |
| 3,728,534 | 4/1973 | Bertram et al. | 35/30 X |
| 3,881,260 | 5/1975 | Hombs | 35/30 |

*Primary Examiner*—William H. Grieb
*Attorney, Agent, or Firm*—Richards, Harris and Medlock

[57] ABSTRACT

The specification discloses a logic learning apparatus including a housing having a plurality of two position switches mounted thereon for movement between logic "0" and logic "1" positions. A plurality of discrete electronic logic circuits are connected in parallel to the switches. Light emitting devices are connected to each of the electronic circuits and are operable to be energized when the switches connected to the circuits are properly operated. A plurality of cards are provided with visual diagrams of different ones of the logic circuits. The housing includes a well portion for receiving the cards, such that the inputs on the cards are positioned adjacent the switches and the outputs on the cards are located adjacent predetermined ones of the light emitting devices. Correct operation of the switches result in illumination of the predetermined light emitting device.

7 Claims, 7 Drawing Figures

LOGIC LEARNING APPARATUS

FIELD OF THE INVENTION

This invention relates to teaching and game apparatus, and more particularly relates to a game apparatus for teaching the function of logic elements and the ability to follow a logical sequence of events.

THE PRIOR ART

Many techniques and devices have been heretofore developed in order to assist in the teaching of electronic logic to students and the like. Many of the previously developed devices have included "plug in" electrical components and circuits which must be plugged into a master board and electrically interconnected with one another in order to provide a particular logic circuit. Such prior devices have been relatively expensive, and have required storage of a large number of relatively bulky electronic components. Further, such previously developed games and teaching devices have been generally primarily directed toward teaching a student how to interconnect a particular circuit, and have not focused directly upon the logic interrelation of a variety of input signals necessary to provide a desired output. A need has thus arisen for a logic game and learning apparatus which is relatively simple and inexpensive, and yet which may be utilized to teach logic and the relationships of a large number of different electronic circuits.

SUMMARY OF THE INVENTION

In accordance with the present invention, a logic learning apparatus includes a housing having a plurality of switches mounted thereon. A plurality of discrete electronic logic circuits are connected to the switches in parallel with one another. Lamps are connected to the output of each of the electronic circuits and are operable to be energized when the switches connected to the circuits are properly operated. Diagram cards are adapted to be disposed on the housing between the switches and the lamps, with each of the cards having a visual representation of a different one of the logic circuits thereon.

In accordance with a more specific aspect of the invention, a logic teaching game includes a housing having a plurality of two position switches mounted thereon. Each of the switches are connected to the input of at least one discrete electronic logic circuit. Each of the logic circuits are unique relative to the other logic circuits and generate an output signal only upon proper operation of the switches connected to the input thereof. A plurality of light generating devices are connected to receive output signals from the logic circuit in order to be illuminated to indicate a successful operation of the switches associated with the logic circuits. A plurality of cards each bear a visual diagram representative of a different one of the logic circuits. Each of the cards has an output terminal representation located at a position adjacent a selected one of the light generating devices when the card is positioned on the housing. The housing includes a well for receiving the plurality of cards such that the inputs of the cards are positioned adjacent the switches and the output terminal representations of the cards are located adjacent the light generating devices.

DESCRIPTION OF THE DRAWINGS

For a more complete understanding of the present invention and for further objects and advantages thereof, reference is now made to the following description taken in conjunction with the accompanying Drawings, in which.

DESCRIPTION OF THE PREFERRED EMBODIMENT

Figure 1:
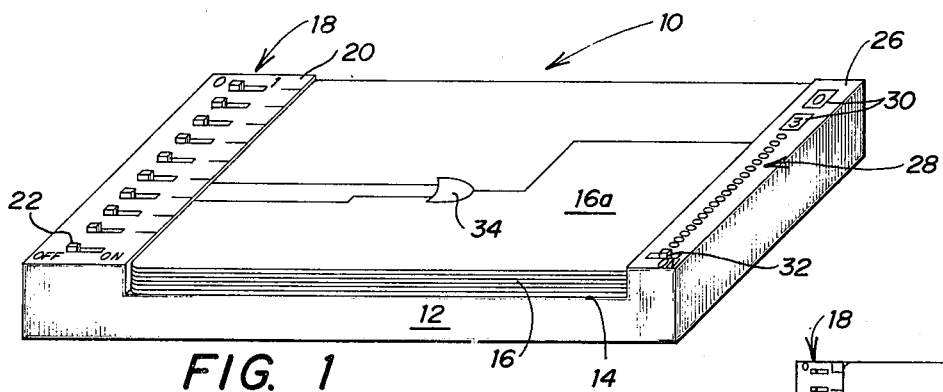
FIG. 1 is a perspective view of the logic learning apparatus of the invention with a card positioned for operation of the apparatus.

FIG. 1 illustrates the logic learning and puzzle solving apparatus of the present invention which is designated generally by the numeral 10. The apparatus includes a housing 12 having a rectangular well 14 formed therein. A plurality of diagram cards 16 are stacked within the well 14, each of the cards 16 bearing a different schematic diagram of an electronic circuit. Nine two-position switches 18 are positioned on a surface 20 of the housing 12. In the illustration of FIG. 1, each of the switches are positioned to the far left position, such position representative of the logic level 0. A suitable legend 0 is provided on the surface 20. The far right position of the switches 18 is representative of the logic level 1 and the legend 1 is also suitably provided on the surface 20 in the manner illustrated. An on/off switch 22 controls the application of power to the switches 18.

An edge surface 26 is provided on the right hand side of the housing 12 and includes a plurality of light emitting diodes (LEDs) 28. The number of LEDs 28 will depend upon the number of different cards 16 to be utilized with the apparatus 10. Two seven-segment displays 30 are also positioned on surface 26 in order to indicate the number of times the switches 18 are operated. Contests can thus be conducted with the apparatus 10 by comparing the number of switch throws as a function of time required for a correct solution of the puzzle. An on/off switch 32 is provided to control the power to the LEDs 28 and the seven-segment displays 30.

The logic learning apparatus 10 is operated in conjunction with the cards 16. Each of the cards bears a different electrical logic circuit. Card 16a is illustrated in FIG. 1 and includes a representative of an OR gate 34, with input lines leading to the sixth and seventh switches 18. The output of the OR gate 34 is directed to a predetermined one of the LEDs 28. The cards 16 may be constructed from any suitable material, but may for example comprise rectangular cardboard cards having printed ink representations of electrical circuits on one side thereof. The cards 16 are dimensioned to fit closely within the well 14 and each of the cards has input lines which lead from different combinations of the switches 18 and output lines which lead to a predetermined one of the LEDs 28 when the card is properly fitted in the well 14.

In operation of the apparatus 10, a particular card is placed upright on the stack in the well 14. The correct ones of the switches 18 are then switched to the proper logic representations 0 or 1 and the corresponding LED 28 becomes illuminated in order to indicate the correct solution to the logic configuration. For example, when the card 16a is disposed on the top of the stack of cards 16, and the sixth and seventh switches 18 are switched such that one or both the switches are in the logic 1 position, then the corresponding LED 28 will become illuminated, thereby indicating a correct solution. If only one operation of the switch 18 was required to provide the correct solution, the numeral one will be illuminated on the seven-segment display 30.

Figure 2:
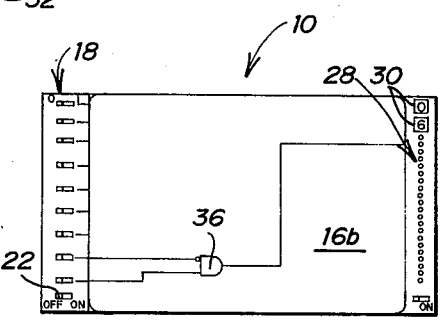
FIG. 2 is a top view of the apparatus shown in FIG. 1 with a different card positioned for operation.

FIG. 2 illustrates the apparatus 10 with a second card 16b positioned at the top of the well 14. Card 16b includes a representation of an AND function gate 36 having inputs adjacent the eighth and ninth switches 18 and an output directed toward an LED 28. When the eighth switch is placed in the 0 position and the ninth switch 18 is placed in the 1 position, the corresponding LED 28 will be illuminated in order to indicate the correct solution of the problem. Only the correct positioning of the eighth and ninth switches 18 will result in the correct LED 28 being illuminated. Again, the number of switch throws will be recorded by the seven-segment display 30.

Figure 3:
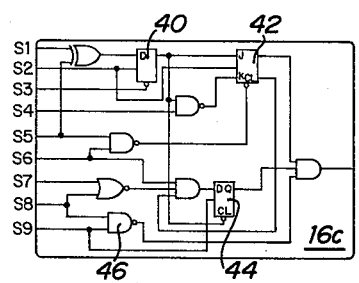
FIG. 3 illustrates a card bearing a schematic diagram of a different logic circuit for solving with the present invention.

FIG. 3 illustrates a third card 16c which includes a relatively complex electronic circuit diagram, including flipflop circuits. Due to the provision of the flipflop circuits, certain of the switches must be operated more than once in order to obtain the desired logic 1 output to illuminate the desired LED 28. In the logic configuration on the card shown in FIG. 3, inputs are applied to each of the nine switches 18. The circuit includes a plurality of exclusive OR, NAND, NOR and AND gates, in combination with D-flipflops 40, 44 and a JK flipflop 42. For ease of description, switch designations S1–S9 are labeled adjacent the card inputs corresponding to the nine switches 18.

In order to obtain a correct solution to the problem shown in FIG. 3, the switch S6 must be placed at logic 1, the switch S7 placed at logic 0, switch S8 at logic 0 and the switch S5 at logic 1, in order to clear the JK flipflop 42 to provide a logic 1 at the D input of D-flipflop 44. The switch S3 must then be set to logic 1, and the switch S1 to logic 0 in order to provide a logic 1 at the D terminal of D-flipflop 40. The switch S2 is inset to logic 0 and then to logic 1 in order that D-flipflop 44 provides a logic 1 at the CL terminal. The switch S9 must then be set to logic 0 and then to logic 1 in order to provide a logic 1 at the Q output of the D-flipflop 44.

Either the switches S8 or S9 must be set to logic 0 in order to provide a logic 1 out of the NAND gate 46. The switch S6 must be set to logic 0 to provide a logic 1 at the CL terminal at the JK flipflop 42. Placing the switch S4 at logic 1 provides a logic 1 at the K terminal of the JK flipflop 42. The switch S2 is then placed to logic 0, then to logic 1 and then to logic 0 in order to clock the JK flipflop 42 to generate a logic 1 output at the Q terminal. The output of the output AND gate of the circuit is then logic 1, thereby illuminating the corresponding LED 28 to indicate the correct solution of the problem.

Figure 4:
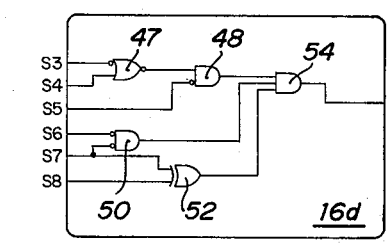
FIG. 4 illustrates yet another card with a different logic diagram which may be solved with the present invention.

FIG. 4 illustrates a fourth card 16d which includes yet another electronic circuit which may be solved with the apparatus 10. The inputs to the circuit shown on card 16d are positioned adjacent switches S3–S8. The illustrated circuit comprises a NOR gate 47, an AND gate 48, an AND gate 50, an exclusive OR gate 52 and an AND gate 54. The output of AND gate 54 is positioned adjacent a predetermined one of the LEDs 28 for illumination thereof in the previously described manner.

In operation of the apparatus 10 with card 16d, switches S3 and S8 are placed in logic 1 positions, while switches S4–S7 are placed in logic 0 positions to generate a logic high at the output of gate 54.

While only four cards 16a–16d have been illustrated as being used in the present invention, it will be understood that a wide variety of different electronic circuits may be placed on cards which are utilized with the present apparatus.

Figure 5:
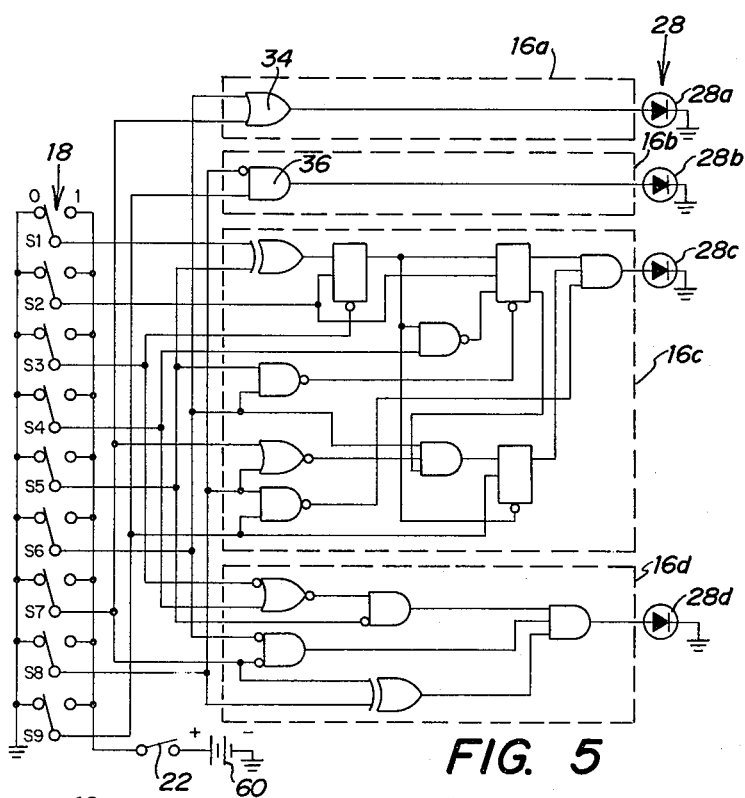
FIG. 5 is a schematic electrical diagram of the electronic circuitry contained in the apparatus shown in FIG. 1 for solving the logic circuits shown on the cards of FIGS. 1–4.

FIG. 5 illustrates the electronic circuitry contained within the housing 12 in order to interconnect the switches 18 with the LEDs 28. While only four electronic circuits are illustrated in FIG. 5, it will be understood that a different electronic circuit will be connected in parallel in the circuit to correspond to each card 16 utilized. Referring to FIG. 5, it will be seen that each of the switches 18 (S1–S9) is illustrated as being connected to the ground terminal. The second position of the switches 18, or the logic 1 position, connects the switch arm with a source of electrical power from a battery 60, when the switch 22 is closed. The voltage applied through the switch arm is applied as a logic 1 input to the various interconnections of the circuitry. The dotted line 16a includes the circuitry previously diagrammatically shown on card 16a. Similarly, the dotted lines 16b–16d contain the actual electronic circuitry shown on cards 16b–16d. An important aspect of the present invention is that the circuits shown in FIG. 5 are connected in parallel with one another, with each of the circuits being identical to the diagrammatic circuit illustrated on a corresponding card. The output of each circuit controls the operation of one of the LEDs 28.

For example, if one or both switches S6 and S7 are switched to a logic 1 position, the output of gate 34 will generate a logic high in order to illuminate the LED 28a. Similarly, if switch S8 is switched to the logic 0 position and switch S9 is switched to the logic 1 position, the output of gate 36 will be a logic high, thereby illuminating the LED 28b. The sequence of operation previously described with respect to FIG. 3 must be accomplished on the switches S1–S9 in order to cause illumination of the LED 28c. Similarly, the sequence of operation of the switches described relative to FIG. 4 must be operated in order to cause illumination of LED 28d.

It will thus be seen that the present device may be provided with a plurality of cards 16 in order to teach logic to the operator. The apparatus 10 may be operated as a game, and the number of switch operations may be counted during a predetermined time in order to determine the fastest operator or solver of the puzzle. It will be understood that other types of puzzles than electronic circuits can be taught with the device, such as fluidic circuits or the like. The electronic circuitry shown in FIG. 5 is packaged within the housing 12 on a printed circuit board or the like. Alternatively, the circuitry may be packaged as integrated circuitry, such as LSI circuitry, PMOS, COSMOS, or the like.

Figure 6:
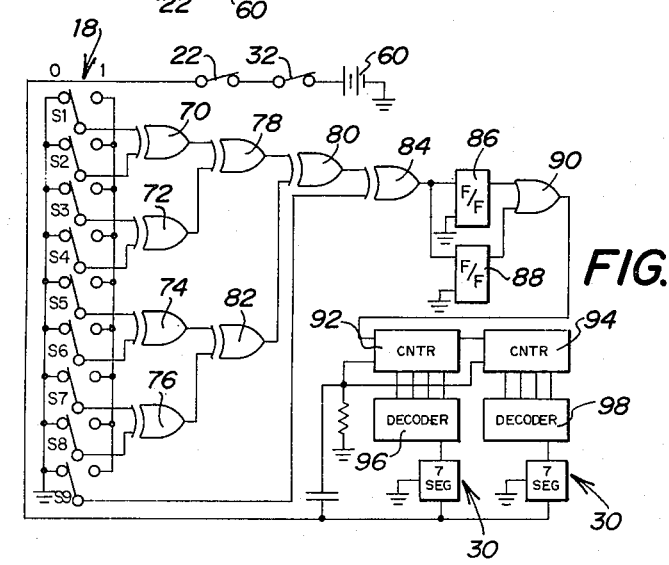
FIG. 6 is a schematic diagram of the electronic circuitry for maintaining a count of a number of operations of the switches of the apparatus shown in FIG. 1.

FIG. 6 illustrates circuitry also connected to the switches 18 and housed within the housing 12 in order to operate the seven-segment display 30. The illustrated positions of the switches 18 (S1–S9) are connected to circuit ground. The remaining terminals of the switches S1–S9 are connected to a source of power supply by battery 60 through switch 22 and switch 32 (FIG. 1). Switch 32 operates to deenergize the seven-segment display 30 and to act as a reset. The switch arms of each of the switches S1–S8 are connected as illustrated to exclusive OR gates 70–76. The output of gates 70 and 72 are applied to an exclusive OR gate 78, the output of which is applied to an exclusive OR gate 80. The output of gates 74 and 76 are applied through an exclusive OR gate 82 to the input of gate 80.

The output of gate 80 and the switch arm of switch S9 are applied as inputs to an exclusive OR gate 84. The output of gate 84 is applied to a terminal of a monostable multivibrator 86 which is interconnected with a monostable multivibrator 88. Multivibrators 86 and 88 may comprise, for example, SN74122 multivibrators. The outputs of the multivibrators are applied through an OR gate 90, the output of which is applied to BCD counters 92 and 94. Counter 92 operates as the units counter, while counter 94 operates as the tens counter. Counters 92 and 94 may comprise, for example, SN74192 counters. The outputs of counters 92 and 94 are applied to BCD to seven-segment decoders 96 and 98, which may comprise, for example, SN7446 decoders. The output of the decoders are applied to the seven-segment displays 30 previously described.

In operation of the circuitry shown in FIG. 6, changes in state of any of the nine inputs provided by the switches 18 will produce either a positive or a negative leading edge when applied through the exclusive OR gate network. Multivibrator 86 generates an output pulse upon the occurrence of a positive edge of an input pulse, while the multivibrator 88 generates an output pulse upon the occurrence of a negative edge of an input pulse. The outputs from the multivibrators 86 and 88 are counted by counters 92 and 94, decoded by the decoders 96 and 98 and displayed by the seven-segment displays 30 which may comprise, for example, seven-segment LEDs. When the counter reaches 99, the count output begins over. Counters 92 and 94 are cleared when the switch 32 is initially placed in the closed position.

Figure 7:
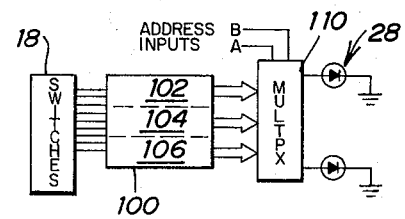
FIG. 7 is a block diagram of another embodiment of the circuitry for the device shown in FIG. 1.

FIG. 7 illustrates the embodiment of the present invention utilizing a semiconductor chip 100 which stores a plurality of sets of different circuits. The nine switches 18 previously described are interconnected with inputs of the semiconductor chip 100, which has three circuit areas 102, 104 and 106. Each of the three areas has formed therein a different set of electronic circuits corresponding to a different set of cards 16. For example, area 102 may comprise 25 different circuits corresponding to a first set of 25 cards 16. Areas 104 and 106 each contain 25 different circuits also corresponding to different sets of 25 cards 16. The outputs of the semiconductor chip 100 are applied through a multiplexer 110 which controls the illumination of a plurality of LEDs 28 in the manner previously described. An address input is provided to the multiplexer 110 in order to select one of the three sets of circuits contained in areas 102, 104 and 106 of the semiconductor chip 100.

With the use of the circuitry shown in FIG. 7, addresses may be applied to the multiplexer 110 during construction of the device such that only one area of the semiconductor chip 100 will be utilized. Any one of the three areas may thus be selected during manufacture to correspond with one of three possible sets of cards. However, if desired, a selection switch may be provided on the housing 12 to enable selection of any of the three sets of circuits by the operator to enable use with any of the three sets of cards.

The present invention may also be utilized in conjunction with a semiconductor memory such as a microprocessor calculator chip or a random access memory (RAM) with external control. With such a circuit, only one LED output would be required, but means would be required to sense which card 16 was presently being operated with. This sensing may be accomplished with the use of apertures through the various cards, or conductive coatings on the cards, which are sensed by a mechanical or electronic sensor to thereby actuate a particular circuit stored in the memory. Alternatively a thumbwheel switch could be used to dial in the card being used.

The present invention provides a series of puzzles or logic circuits that require knowledge of the logic element functions, and the ability to follow a logical sequence of events, in order to solve them. The puzzle circuits are designed to enable a player to learn and master logic, organize thoughts accurately and rapidly, and to present an enjoyable intellectual and competitive challenge. Many puzzles utilized with the invention may have several solutions that will help maintain interest in each puzzle. The present invention utilizes a seven-segment display in order to enable the game to be played competitively by automatically counting the number of switch flips.

Whereas the present invention has been utilized with respect to specific embodiments thereof, it will be understood that various changes and modifications will be suggested to one skilled in the art, and it is intended to encompass such changes and modifications as fall within the scope of the appended claims.

What is claimed is:

1. A logic teaching game comprising:
    a housing having a plurality of two position switches mounted thereon and operable to generate combinations of logic ones and logic zeros,
    a plurality of discrete electronic logic circuits connected in parallel to one another,
    each of said switches connected to the input of at least one of said plurality of discrete electronic logic circuits to supply said combinations of logic ones and logic zeros,
    each of said logic circuits being unique relative to the other logic circuits and generating a predetermined output signal only upon proper operation of said switches connected to the input thereof,
    a plurality of light generating devices each connected to receive said predetermined output signal from one of said logic circuits in order to be illuminated to indicate a successful operation of said switches associated with said logic circuits,
    a plurality of cards each bearing a visual diagram representation of a different one of said logic circuits and each having a single output line, wherein said output line points to a single position adjacent a selected one of said light generating devices when said card is positioned on said housing, and means in said housing for receiving, aligning and storing said plurality of cards during both operation and non-use of the logic teaching game, such that input terminal representations on said cards are positioned adjacent said switches and said output line on said cards is located adjacent a selected one of said light generating devices.

2. The logic teaching game of claim 1 and further comprising:

means for counting the number of switching operations to successfully illuminate a specified one of said light generating devices, and display means on said housing for displaying the total count of said counting means.

3. The logic teaching game of claim 1 wherein said means in said housing for receiving, aligning and storing said plurality of cards, both during operation and non-use of the logic teaching game comprises a well, wherein the top one of said cards may be selectively removed.

4. The logic teaching game of claim 1 wherein said light generating devices comprise light emitting diodes.

5. The logic teaching game of claim 1 wherein said logic circuits comprise electronic logic gates.

6. A logic learning apparatus comprising:

a housing having a plurality of two position switches mounted thereon and operable to generate combinations of logic ones and logic zeros, a plurality of discrete electronic logic circuits connected to said switches in parallel to one another and each having a different output, a plurality of indicators connected at the output of said electronic circuits and each operable to be energized from a different one of said outputs when said switches connected to the corresponding one of said circuits are operated to select a predetermined combination of logic ones and logic zeros, and a plurality of cards for being disposed on said housing adjacent said switches and said indicators, each of said cards having a visual representation of a different one of said logic circuits and an output line contained thereon, said output line on each of said cards pointing to a selected one of said indicators which is operable only if said predetermined combination of switches is selected.

7. A logic learning apparatus comprising;

a housing having a plurality of switches mounted thereon, a plurality of discrete electronic logic circuits connected to said switches in parallel to one another, lamp means connected at the output of each of said electronic circuits and operable to be energized when said switches connected to said circuits are properly operated, card means for being disposed on said housing adjacent said switches and said lamp means, each of said card means having a visual representation of a different one of said logic circuits thereon, and means for counting the number of switching operations to successfully energize a specific one of said lamp means, and means on said housing for displaying said number of switching operations.

* * * * *